United States Patent [19]

Bennett, Jr. et al.

[11] 4,077,488

[45] Mar. 7, 1978

[54] GUIDANCE ASSIST SYSTEM FOR AGRICULTURAL MACHINES

[75] Inventors: Clarence L. Bennett, Jr., Groton; Carl E. Bohman, Sudbury, both of Mass.; Joseph D. DeLorenzo, Webster, N.Y.; Harald Wilhelmsen, Carlisle, Mass.

[73] Assignee: Sperry Rand Corporation, New York, N.Y.

[21] Appl. No.: 696,444

[22] Filed: Jun. 15, 1976

[51] Int. Cl.$^2$ .............................................. B62D 1/28
[52] U.S. Cl. ........................................ 180/98; 56/10.2; 56/DIG. 15; 172/5; 180/79.1; 250/202
[58] Field of Search ................... 180/98, 131, 79.1; 56/10.2, 121.41, DIG. 2, DIG. 7, DIG. 15; 172/5, 6; 250/202, 233

[56] References Cited

U.S. PATENT DOCUMENTS

| | | | |
|---|---|---|---|
| 3,172,496 | 3/1965 | Rabinow | 180/98 X |
| 3,239,672 | 3/1966 | Gabloffsky | 250/233 X |
| 3,290,506 | 12/1966 | Bertram | 250/233 X |
| 3,425,197 | 2/1969 | Kita | 180/79.1 X |
| 3,672,777 | 6/1972 | Llop | 250/202 X |
| 3,845,319 | 10/1974 | Walter | 250/202 X |
| 3,946,825 | 3/1976 | Gail | 180/131 |
| 3,952,828 | 4/1976 | Stampfer | 180/79.1 X |

Primary Examiner—John P. Silverstrim
Attorney, Agent, or Firm—Howard P. Terry

[57] ABSTRACT

A guidance assist system is mounted on an agricultural machine for directing the lateral movement thereof with respect to the severed edge of the crop material being harvested thereby. The crop, including the severed edge, is periodically, optically, scanned and an output signal, in response to the reflected illumination therefrom, is generated having a discontinuity therein representative of the severed crop edge. The deviation of this discontinuity from a predetermined point along the scan is determined by the apparatus and an error signal representative thereof is coupled to the utilization means for directing the lateral movement of the agricultural machine such that the error signal is reduced towards zero.

11 Claims, 12 Drawing Figures

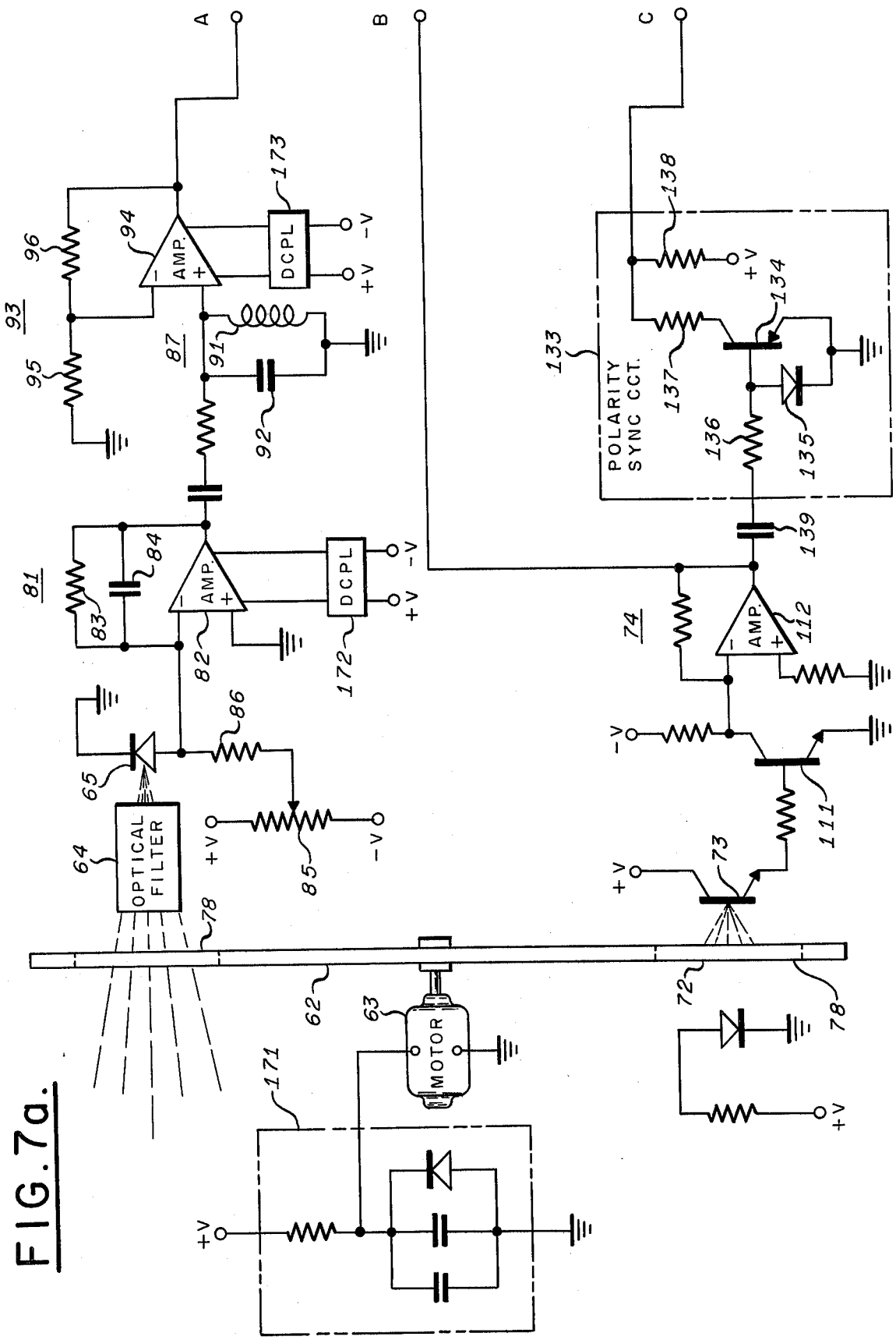

GUIDANCE ASSIST SYSTEM FOR AGRICULTURAL MACHINES

BACKGROUND OF THE INVENTION

1. Field of the Invention

The invention pertains to guidance systems for agricultural machines and, more particularly, to an optical guidance system for directing the lateral movement of an agricultural machine relative to a severed edge of the crop material or relative to a windrow of crop previously severed.

2. Description of the Prior Art

The field operation of an agricultural harvesting machine is a tedious process that is tiring to the human operator. For efficient operation it is necessary that the machine be directed such that the header engages the maximum amount of crop without leaving any standing crop. Studies have shown that more than half of the operator's attention capacity is engaged in guiding the harvesting machine along the crop edge to attain the maximum intake. After many hours in the field, the operator's responses often deteriorate resulting in large steering errors thereby lessening the intake or leaving patches of crop unsevered. Accordingly, providing a guidance assist on the harvesting machine lessens the tedium, permits more accurate steering control over longer working days and maintains maximum intake while harvesting.

Guidance of the harvesting machine at present relies on the operator's visual perception of the crop edge. This implies the existence of a contrast discriminant between the severed and unsevered crop material which is perceived by the operator and from which he steers the machine. A system which relies primarily on amplitude measurements of the reflected illuminations from the severed and unsevered portions of the crop would obviously be prone to numerous errors due to the great variations in the reflected illumination. However, the system of the present invention makes use of the fact that a contrast discriminant does exist and attends to by locating the relative position of the discrimination in an optical scan of the crop.

Automatic steering systems for harvesters are known in the art, such as, U.S. Pat. No. 3,946,825 which issued to Josef Gail on Mar. 30, 1976 and British patent specification No. 1,371,276, however, such known systems involve sensing means disposed on a boom extending from the machine for contacting or contactless sensing of the crop. Specifically, the contactless sensing refers to an emitter and a receiver for sensing the crop material. The limitations, however, of a sensor disposed on a boom or arm extending from the vehicle and of a luminous transmitter under various lighting conditions for accurate steering are apparent.

SUMMARY OF THE INVENTION

The present invention comprises guidance assist apparatus for directing the lateral movement of an agricultural machine with respect to the severed edge of the crop material being harvested. The crop directly preceding the machine is periodically scanned by an optical sensing device in cooperation with a scanner. The output therefrom provides a representation of the crop as viewed during the scan with a discontinuity therein corresponding to the severed crop edge.

The output from the sensing device is filtered and coupled to circuitry wherein the location or phase of the discontinuity is matched or compared against a predetermined point in the scan. The apparatus thereafter provides an error signal representative of the deviation of the discontinuity from the predetermined point. The error signal may be coupled to utilization means for directing the lateral movement of the machine so that the error signal is reduced towards zero.

The apparatus further includes means for maintaining the polarity and magnitude of the error signal independent of whether the relatively more intense illumination is scanned prior or subsequent to the severed crop edge. Additionally, the apparatus further includes means for providing an indication when the contrast between the severed and unsevered crop is insufficient to maintain reliability with the system.

BRIEF DESCRIPTION OF THE DRAWINGS

FIGS. 7a and 7b depict schematic diagrams of the apparatus comprising the embodiment of FIG. 4.

DESCRIPTION OF THE PREFERRED EMBODIMENT

Figure 1:
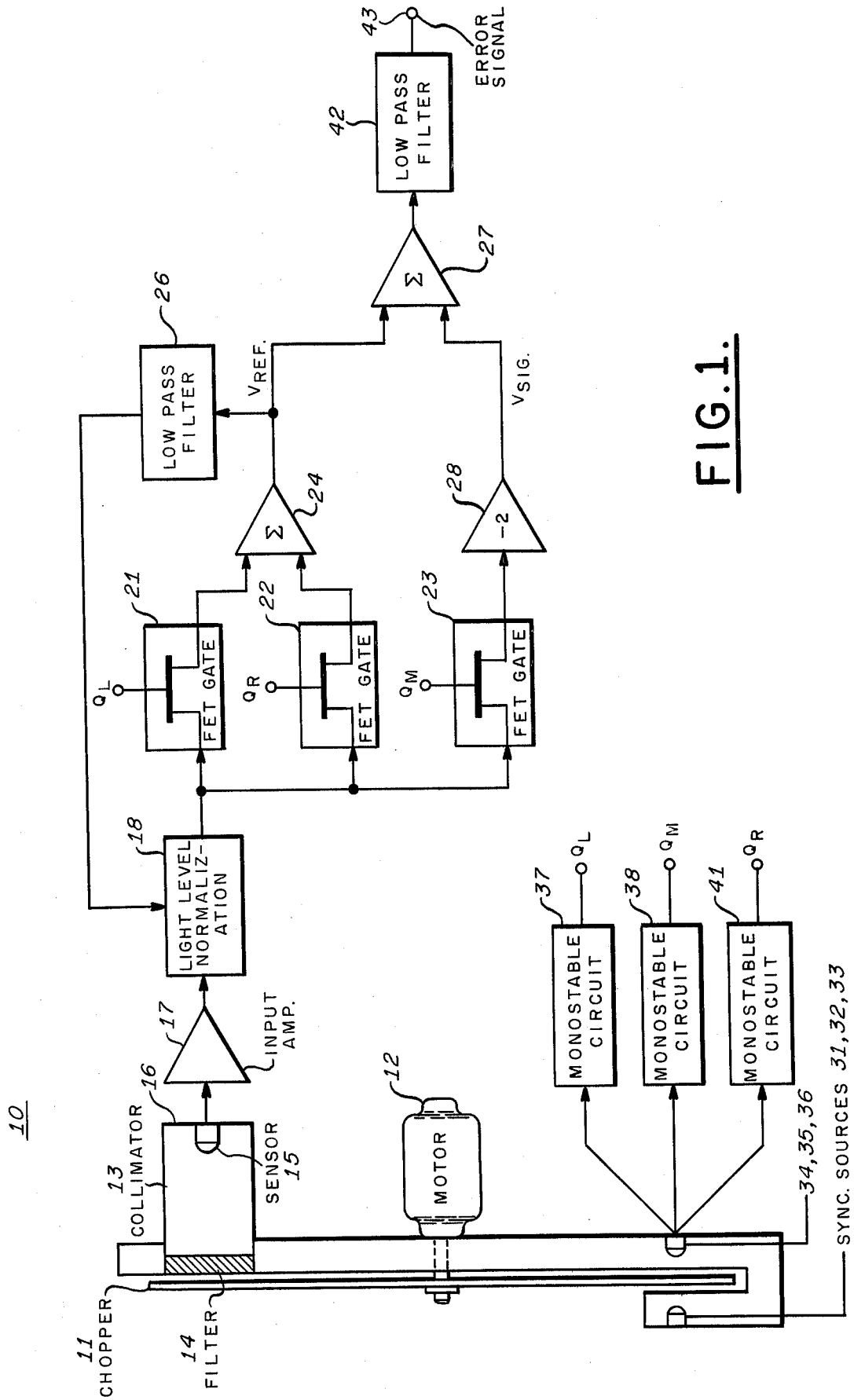
FIG. 1 is a block schematic diagram depicting one embodiment of the present invention.
Figure 2:
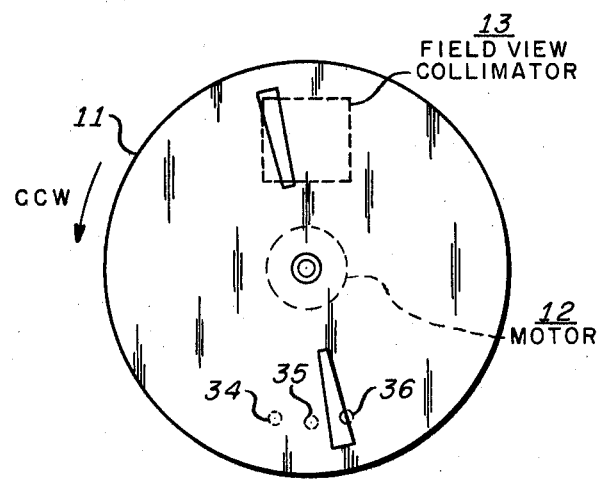
FIG. 2 is an illustration depicting the disc utilized in the embodiment in FIG. 1 and, in particular, illustrating the apertures therein and the location of the collimator and the sync source sensor locations with respect thereto.

Referring now to FIG. 1, a block diagram of one embodiment 10 of the guidance assist system of the present invention is depicted. A disc or chopper 11 having at least two apertures therein (as depicted in FIG. 2) is rotated by a motor 12. A collimator 13 comprising an optical bandpass filter 14 and a photo-sensor 15 and enclosed by a collimator tube 16 is disposed such that the apertures in the chopper 11 sweep across the field of view thereof. The output from photo-sensor 15 is amplified by input amplifier 17 and coupled to a light level normalization circuit 18, the output from which is coupled to three electronic switching circuits 21, 22, and 23. The outputs of electronic switching circuits 21 and 22 are coupled to a summation circuit 24 having an output which is coupled to a lowpass filter 26 and summation circuit 27. The lowpass filter circuit 26 is coupled to the light level normalization circuit 18 forming a feedback circuit thereto. The output from electronic switching circuit 23 is coupled to an amplifier 28, having a gain, for example, of −2, and whose output is coupled to summation circuit 27.

The chopper or disc 11 is disposed between a series of three synchronous illumination sources 31, 32 and 33, preferably LED's, and a series of three photodetectors 34, 35 and 36, as shown in FIG. 2, such as photo-transistors, and which are aligned directly behind the synchronous illumination sources 31, 32, 33. The synchronous illumination sources and the photodetectors are disposed such that the apertures in the rotating disc 11 periodically permit illumination of the photodetectors from the corresponding synchronous illumination source. Each photodetector 34, 35 and 36 triggers a monostable circuit 37, 38 and 41, respectively, the outputs of which, $Q_L$, $Q_M$ and $Q_R$ are coupled to the electronic switching circuits 21, 23 and 22, respectively. Additionally, the output of summation circuit 27 is coupled through a lowpass filter circuit 42 to the error signal output terminal 43.

The embodiment 10 of the present invention represents a balanced reflectivity crop edge sensor. In particular, the present invention relies on a contrast between the reflected illumination from the cut or severed crop and the unsevered or uncut crop. As might be expected, the reflectivity from the crop material, whether severed or unsevered, varies considerably with changes in the ambient lighting conditions. However, it has been found that there remains for almost a full spectrum of ambient lighting conditions, a definite contrast in the reflected illumination from the cut crop as opposed to the uncut crop which may be utilized to assist in the guidance of the machine as will be described hereinafter.

The apparatus of the embodiment 10 of the present invention shown in FIG. 1 is mounted on a crop harvesting machine (not shown) such that the field of view of the collimator includes the crop material in the immediate path of the harvesting machine and including the severed edge of the crop therein. In order to insure a satisfactory contrast between the severed or unsevered crop material, the collimator should be disposed such that the field of view thereof forms an angle with respect to the crop material, preferably on excess of 45°.

Assuming that the disc 11, a front view of which is depicted in FIG. 2, is rotating counterclockwise, then the crop in the immediate path of harvesting machine will be scanned from left to right with respect to the operator of the harvesting machine. Accordingly, the reflected illumination from the crop is periodically permitted to reach the optical bandpass filter 14 in the form of a scan from left to right. An optical bandpass filter is chosen with a wavelength bandpass in which it is known that a good contrast will exist between the reflected illuminations from the severed and unsevered crops such as, for example, a 1% interference-type optical filter centered at 6500 Angstroms. The output from the optical bandpass filter 14 is detected by the photo-sensor 15, preferably a silicon photo-diode, which generates an electrical signal having a magnitude which varies as a function of the illumination detected thereby.

Figure 3:
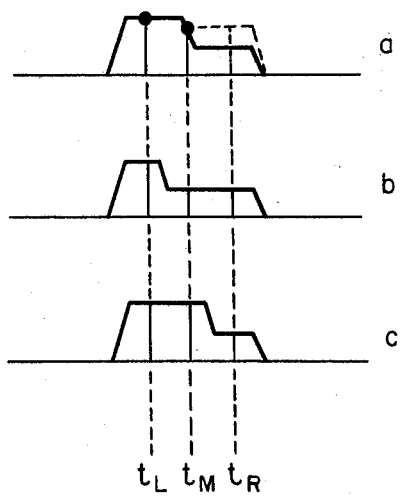
FIGS. 3a, 3b and 3c are a series of graphic illustrations depicting the output from the optical sensor of the embodiment in FIG. 1 in idealized form when the severed crop edge is located at the center of the scan, to the left of the center of the scan and to the right of the center of the scan, respectively.

Referring now to FIGS. 3a, 3b and 3c, the output, in idealized form, of the photo-sensor 15 is depicted as a function of the location of the crop edge within the scan. More particularly, FIG. 3a represents the output from the photo-sensor 15 when the crop edge is located directly in the center of the scan (corresponding to the situation where the harvesting machine is directly oncourse). In FIG. 3b, the output of the photo-sensor 15 represents the situation where the crop edge is located to the left of center on the scan indicating that the harvesting machine is to the right with respect to the crop edge. In FIG. 3c, the output of the photo-sensor is depicted wherein the crop edge is located to the right of the center of the scan indicating that the harvesting machine is disposed too far to the left of the crop edge.

The output from the photo-sensor 15 is amplified by input amplifier 17 and coupled through a light level normalization circuit 18, to be described more fully hereinafter, to electronic switching circuits 21, 22 and 23. The electronic switching circuits 21, 22 and 23, each preferably comprised of a field-effect transistor, are arranged so that different phases of the amplified output from the photo-sensor 15 for each scan are coupled therethrough.

The series of synchronous photodetectors 34, 35 and 36 are arranged so that the illumination from synchronous illumination sources 31, 32 and 33 respectively, will be detected thereby as an aperture in the disc 11 sweeps thereby. Moreover, the synchronous illumination sources and the synchronous photodetectors are further disposed such that the photodetector 34 detects the illumination from synchronous illumination source 31 at a time $t_L$ when the field view of the collimator 13 is restricted to the left side of the crop material; synchronous photodetector 35 detects the illumination from synchronous illumination source 32 at a time $t_M$ when the field of view of the collimator 13 is restricted to the center portion of the scan; and synchronous photodetector 36 detects the illumination from the synchronous illumination source 33 at a time $t_R$ when the field of view of the collimator 13 is restricted to the right side of the crop scene being scanned. Accordingly, trigger pulses $Q_L$, $Q_R$ and $Q_M$ are synchronously produced from monostable circuits 37, 41 and 38, respectively, and corresponding to the left, right, and center of the scan as viewed by the bandpass filter 14.

The trigger outputs $Q_L$, $Q_R$ and $Q_M$ are coupled to the gate electrodes of electronic switches 21, 22 and 23, respectively. As a result, the output of the photo-sensor 15 corresponding to the left side of the crop scanned by the apparatus (time $t_L$ in FIG. 3) is coupled through electronic switch 21; the output of the photo-sensor 15 corresponding to the right side of the crop scanned by the apparatus (time $t_R$ in FIG. 3) is coupled through electronic switching circuit 22; and the output of the photo-sensor 15 corresponding to the middle portion of the scan of the crop (time $t_M$ in FIG. 3) is coupled through electronic switching circuit 23.

As illustrated in FIG. 1, the outputs from switching circuits 21 and 22 are coupled to a summing amplifier where they are summed to produce a signal $V_{REF}$. The output from switching circuit 23 is coupled through an amplifier circuit, having a gain of −2, resulting in a signal $V_{SIG}$. $V_{REF}$ and $V_{SIG}$ are coupled to the inputs of a summation circuit 27 where they are summed together to produce an output signal $V_{ERR1}$. Accordingly, the output from summation circuit 27 $V_{ERR1} = V_{REF} + V_{SIG}$. Since $V_{REF} = V_L + V_R$ where $V_L$ and $V_R$ are equal to the voltage outputs from the photosensor corresponding to the left and righthand portions of the scan, respectively, and since $V_{SIG} = -2 \times V_M$, where $V_M =$ the output from the photo-sensor 15 corresponding to the middle portion of the scan, $V_{ERR1} = V_L + V_R - 2 V_M$. $V_{ERR1}$ is coupled through a lowpass filter 42, which filters out the fluctuations in the signal $V_{ERR1}$ due to the rotation of the disc or chopper 11 and produces a d.c. error signal $V_{ERR}$.

Referring to FIG. 3a, 3b and 3c, can be appreciated that the output of $V_{ERR}$ is substantially equal to zero when the output from photodetector 15 corresponds to FIG. 3a. Correspondingly, the output $V_{ERR}$ will have a positive polarity when the output from photodetector 15 corresponds to FIG. 3b and a negative polarity when the output from photodetector 15 corresponds to FIG. 3c. As such, the error signal $V_{ERR}$ can be coupled to a utilization means which will direct the lateral movement of the harvesting machine such that the error signal $V_{ERR}$ is reduced to zero.

A lowpass filter circuit 26 provides a feedback circuit to the light level normalization circuit so that variations in the ambient lighting are compensated therefor. Moreover, the light level normalization voltage is derived from the right and left samples of the photodetector 15 output so that an off-course condition does not give rise to a change in the light level normalization voltage. The collimator tube 16 which houses the optical bandpass filter 14 and the photodetector 15 also provides optical shielding therefor. Similarly, optical shielding is provided for the synchronous illumination source and photodetector.

It can be appreciated, therefore, that the balanced reflectivity crop edge sensor system 10 depicted in FIG. 1 provides an indication of the crop edge which is insensitive to variations in the reflected illumination from the crop due to varying ambient lighting conditions since the machine is directed according to the location of a discontinuity in the output from the photodetector with respect to the center of the scan. It can be further appreciated that the number of apertures fabricated in the disc or choper 11 does not have to be limited to two but may include a plurality of symmetrically spaced apertures as will become apparent from the discussion with respect to the second embodiment of the present invention.

Figure 4:
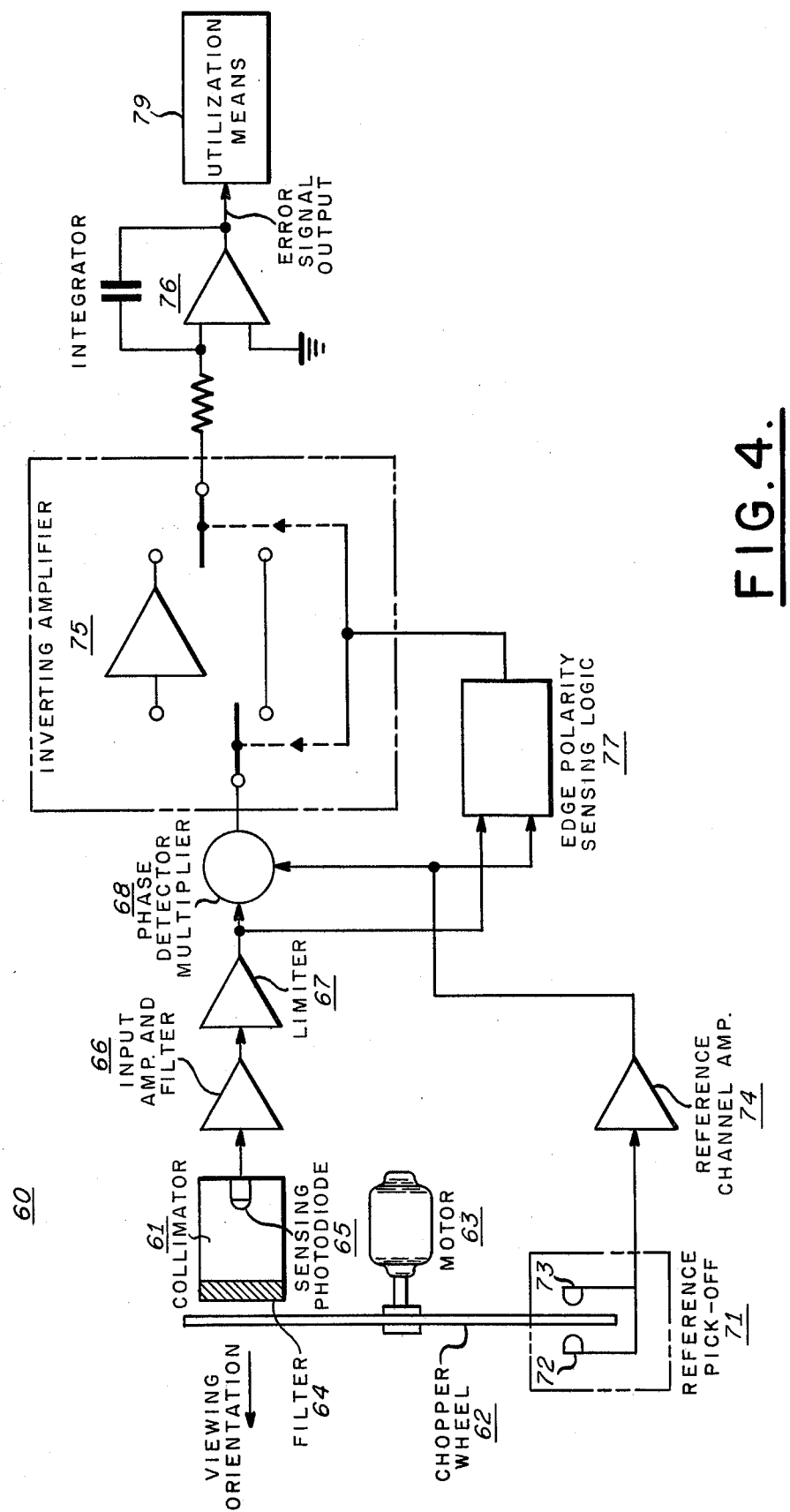
FIG. 4 is a block diagram depicting a second embodiment of the present invention.

The second and preferred embodiment 60 of the present invention is depicted in block diagram form in FIG. 4. The field of view of the collimator 61 is modulated or chopped by the disc 62 which is rotated by motor 63. The chopped or modulated light is filtered by optical bandpass filter 64 and detected by photodetector 65, the filter 64 and the photodetector 65 comprising the collimator 61. The output from photodetector 65 is amplified by amplifier 66 and thereafter coupled through a limiting amplifier 67 to the phase detector multiplier circuit 68.

A reference pick-off circuit 71 comprising a synchronous illumination source 72, a photodetecting means 73 are situated so that the illumination detected by the photodetecting means is modulated or chopped by the rotating disc 62 in a synchronous fashion with respect to the field of view of collimator 61. Accordingly, a series of signals are detected by photodetecting means 73 amplified by reference channel amplifier 74 and coupled to the phase detector/multiplier circuit 68 for providing a window signal during which the output from the photodetecting means 65 may be sampled. The output signal from phase detector 68 during each sampling period is coupled through adjustable inverter circuit 75 to an integrator circuit 76 where it is integrated and coupled to a utilization means 79 for directing the lateral movement of the harvesting machine. Additionally, an edge polarity sensing circuit 77 which is coupled to the output of the reference channel amplifier 74 and limiting amplifier 67 adjusts the inverting amplifier circuit 75 to compensate for variations in the reflected illumination from the crop with respect to the discontinuity at the crop edge and which will be described in greater detail hereinafter.

Figure 5:
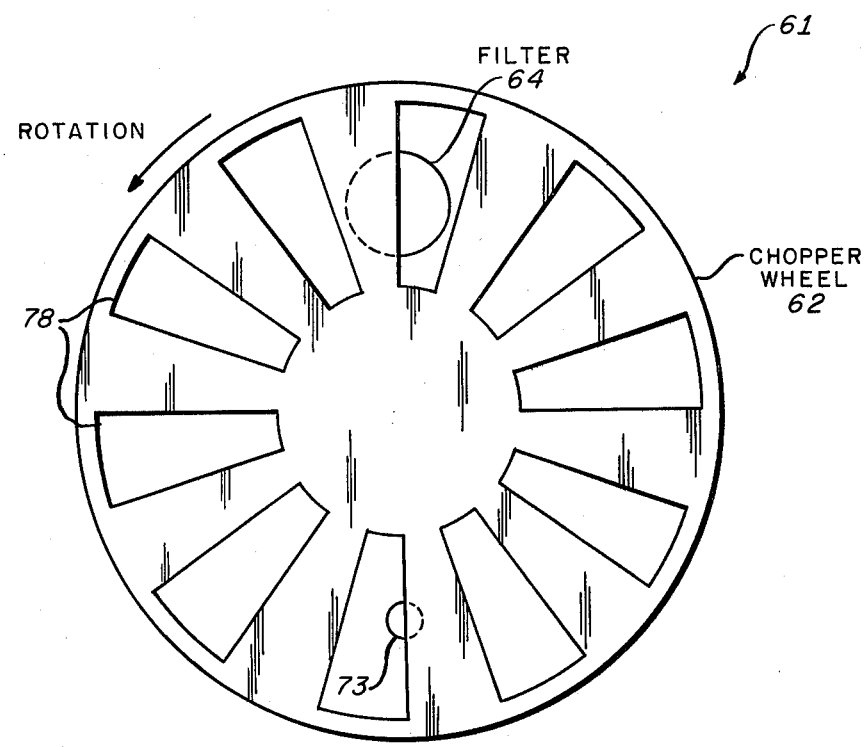
FIG. 5 is an illustration of the disc utilized in the embodiment of FIG. 4 and depicting, in particular, the location of the photodiode and filter and reference channel photo-diode with respect to the apertures in the disc.
Figure 7B:
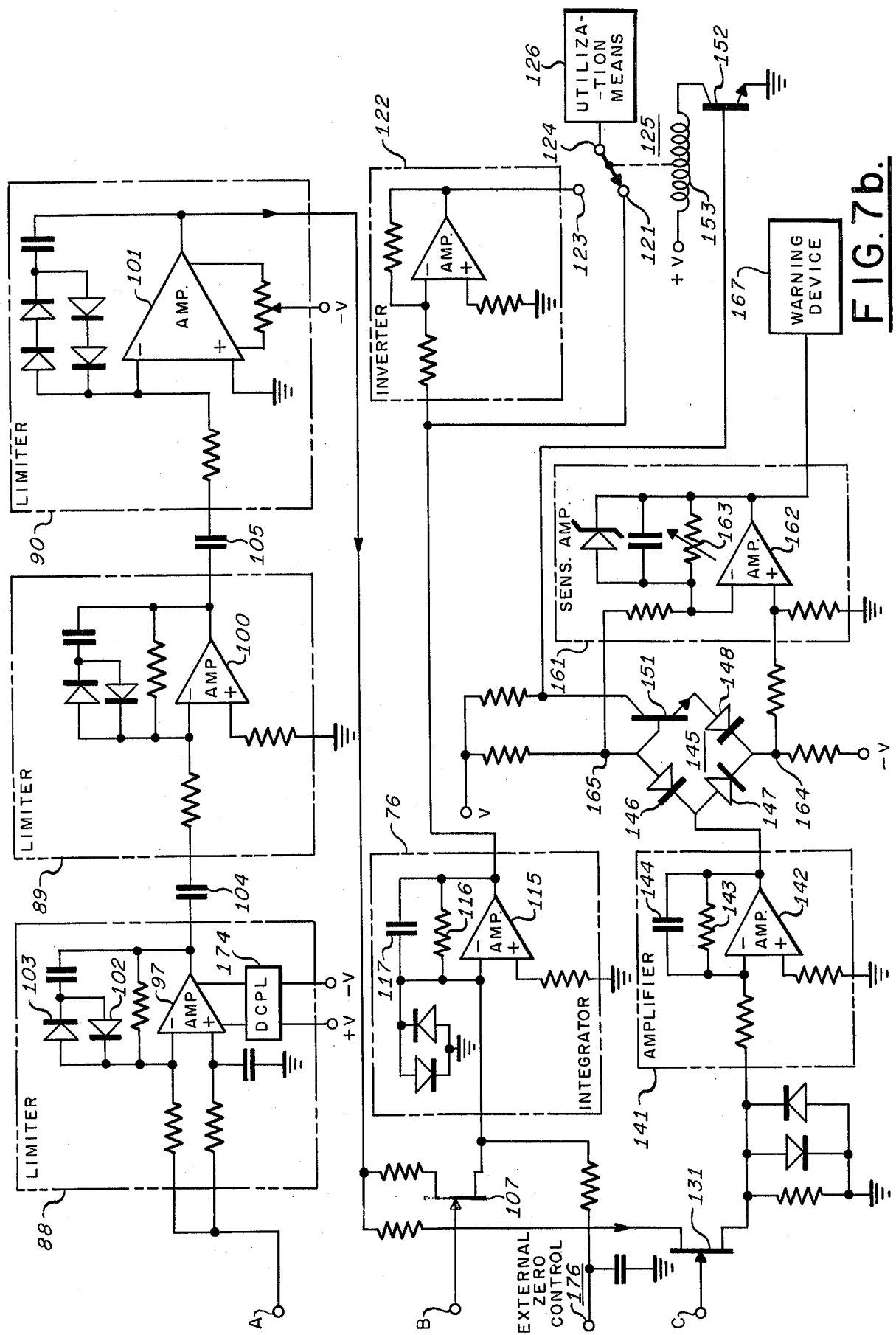

Referring now to FIGS. 5, 7a and 7b, a more detailed description of the second embodiment 60 of the present invention will be described. In FIG. 5, a front view (with respect to the crop) of the disc or chopper wheel 62 is presented. The chopper wheel 62 is fabricated with a plurality of symmetrical apertures 78 synchronously disposed therein. In particular, FIG. 5 is shown with ten such apertures 78 equiangularly disposed about the outer periphery of the chopper wheel 62. FIG. 5 also depicts the synchronous disposition of the reference photodetector 73 with respect to the optical bandpass filter 64. As shown therein, the field of view of the bandpass filter 64 (as indicated by the larger diameter with respect to reference photodetector 65) is substantially larger than that of reference photodetector 65. Accordingly, each window signal produced by the photodetector 73 in response to the illumination from the synchronous illumination source 72 (not shown in FIG. 5) will begin after and terminate before the corresponding signal produced by photodetector 65 in response to the related scan of the crop coupled through optical bandpass filter 64.

Similar to the embodiment in FIG. 1, the apparatus of the embodiment in FIG. 4 and particularly the chopper wheel 62 of the collimator 61, motor 63 and the reference pick-off circuit 71 are disposed on the harvesting machine at an angle with respect to the crop material being harvested. As previously indicated, this angle preferably exceeds 45°.

Referring now to FIGS. 7a and 7b, a detailed description of the operation of the apparatus 60 will be detailed. A chopping wheel 62, comprised of, for example, a circular disc 4¾ inches in diameter, fabricated from 1/32 inch aluminum and having milled therein ten equally spaced 13/16 inches long, truncated-wedge segments. As each aperture or segment rotates by the optical filter 14, a scan of the crop from left to right, or right to left depending on the rotation of the chopper wheel 62 is optically coupled thereto. The reflected illumination therefrom the crop is filtered by the optical bandpass filter which as a bandpass with a center wavelength which is known to provide good contrast between the reflected illumination from cut versus uncut crops, such as 6500 Angstroms. The output therefrom is coupled to a photodetector, preferably a PIN-5D Schottky-barrier silicon photodiode which operates in the photovoltaic (or self-generating) mode and which produces an output signal which varies as a function of the intensity of the reflected illumination detected thereby.

The output from the photodiode 65 is coupled to a transresistance amplifier 81 comprising operational amplifier 82, resistor 83 and filter capacitor 84 for amplifying the photodiode output. Additionally, a d.c. offset circuit such as that shown in FIG. 7a comprising variable resistor 85 and resistor 86 may be incorporated to provide a d.c. adjustment voltage to offset any induced d.c. offset voltages. The amplified output from amplifier circuit 81 is coupled through an LC bandpass filter 87 for providing additional noise rejection while passing the frequency of interest, which corresponds to the fundamental frequency of the chopped light signal. The LC bandpass filter 87 is comprised primarily of inductor 91 and capacitor 92 which are chosen to resonate at the frequency of interest and, thus, vary as a function of the angular velocity of the disc and the number of apertures therein. The filter circuit 87 is coupled to amplifier circuit 93 comprising operational amplifier 94 and resistors 95 and 96. Amplifier 93 forms a high input impedance voltage follower to minimize the loading effects on the LC bandpass filter circuit 87.

The output from amplifier circuit 93 is coupled to a limiter circuit which for this example is comprised of three cascaded limiter stages 88, 89 and 90 as illustrated in FIG. 7b. Each limiter stage is comprised of an operational amplifier 97, 100 and 101, respectively, having a back-to-back diode arrangement in the feedback circuit thereof as depicted, for example, at 102 and 103. Additionally, capacitors 104 and 105 are utilized to provide capacitor coupling between the cascaded limiter stages and thereby avoid cumulative effects of d.c. offset voltages. The output signal from limiter stage 90 is a ground-referenced square wave, as depicted in curve 2 of FIG. 6a wherein the zero crossings therein correspond to the discontinuity in the output from photodetector 65 in response to the scanning of the crop edge.

The output signal from limiter stage 90 is coupled to an electronic switching circuit 107, preferably an N-channel, junction, field-effect transistor. The gate electrode thereof is coupled to the output from the reference channel amplifier 74 so that the field-effect transistor may be utilized as an analog sampling switch. More particularly, the illumination from the synchronous illumination source 72, preferably an LED is periodically detected by photodetector 73, preferably a photo-transistor as heretofore described. As depicted in FIG. 7a, the output from the photo-transistor 73 is amplified by the reference channel amplifier 74 comprising, for example, transistor 111, operational amplifier 112 and the associated resistor components. The output therefrom is coupled to the gate electrode of field-effect transistor 107 (shown in FIG. 7b) thereby providing a periodic gate signal to the gate electrode of the field-effect transistor 107, each having a time duration preferably equal to one half that of the corresponding scan detected by photo-transistor 65 as has been heretofore described.

Figure 6A:
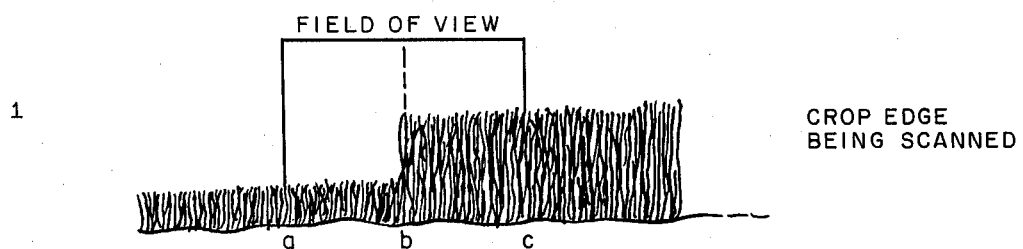
FIGS. 6a, 6b and 6c are a series of graphic illustrations wherein each comprises a view of the crop including the severed crop edge, the output from the optical sensing means therefor, the output from the reference circuit means, and the symmetrical sampling coupled to the integrator for generation of the error signal.
Figure 6A:
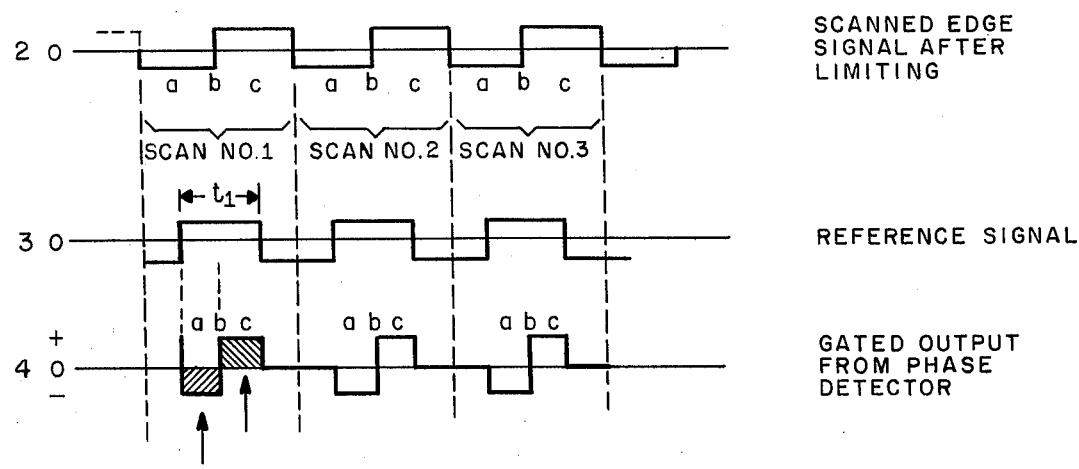

As an illustration thereof, drawings 2 and 3 of FIG. 6a may be compared. Accordingly, it can be appreciated that the time period $t_1$ of the window signal (gate signal to field-effect transistor 107) is one half that of the time period of the output signal from photodetector 65 with respect to the corresponding scan (scan no. 1). The utilization of a window or sampling signal having time duration equal to one half that of the corresponding scan signal will remove from the output signal from limiter stage 90 any irregularities therein occurring at the transitions between successive scans. Since the synchronous illumination source 72 and photodetector 73 are synchronously disposed with respect to the collimator, the output signal from field-effect transistor 107 coupled to integrator 76 presents a sample of each scan signal which is symmetrical with respect to the center of each scan, that is, the center of each reference signal occurs simultaneously with the center of the corresponding scan signal.

Figure 6B:
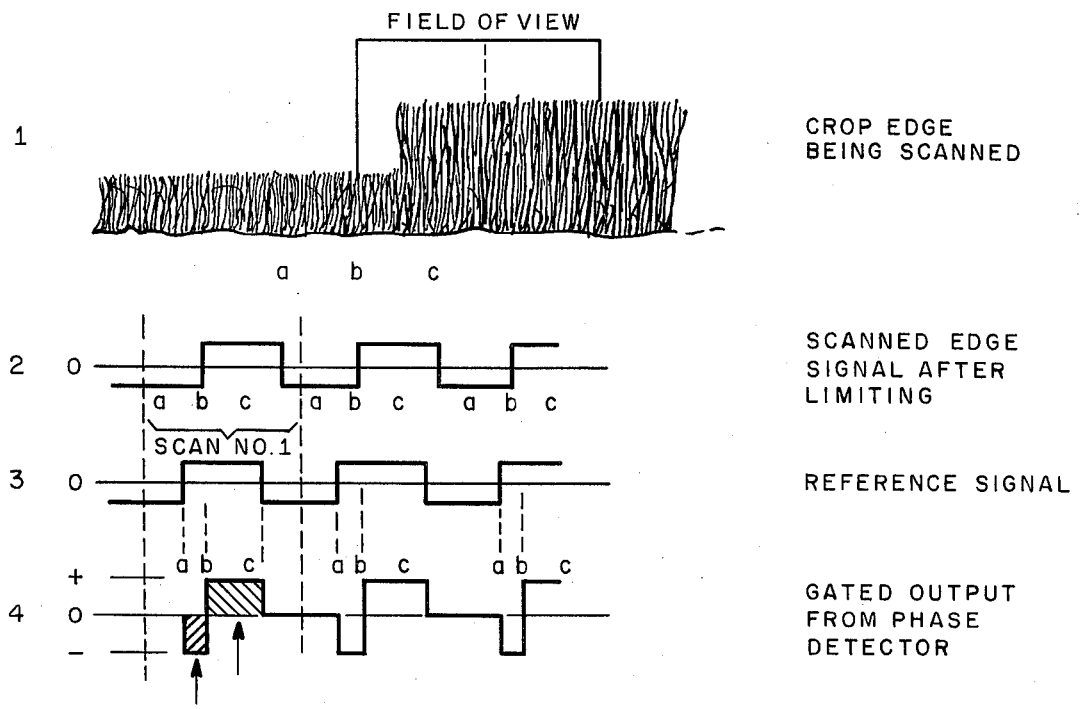
Figure 6C:
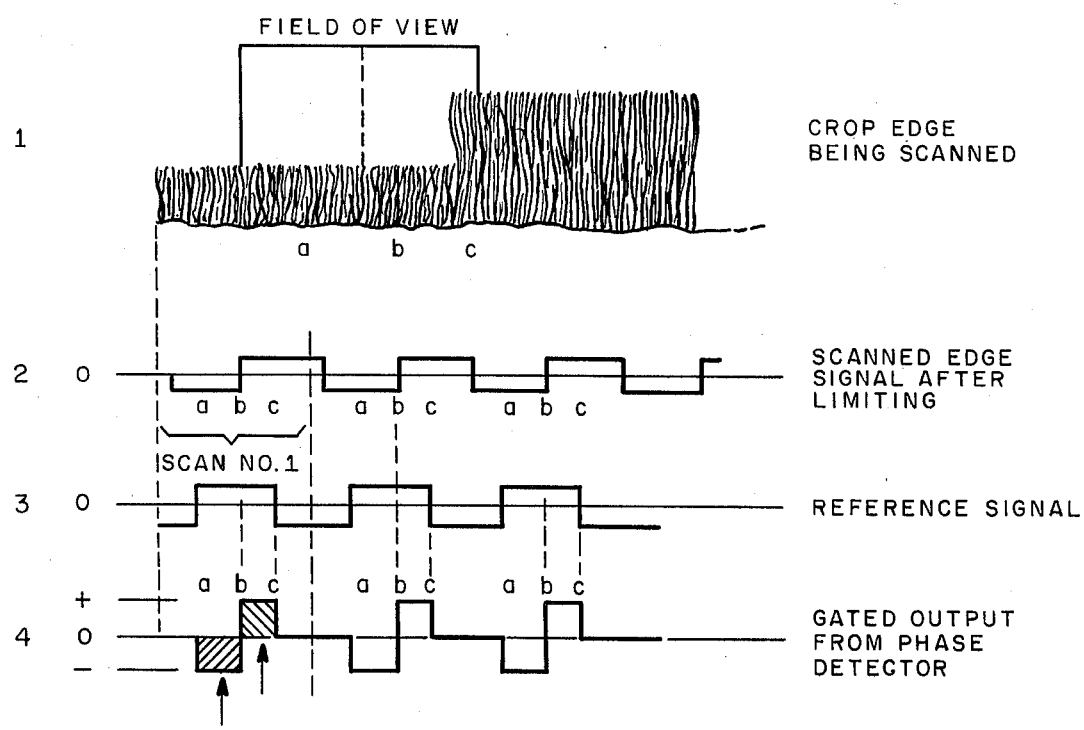

Referring now to FIGS. 6a, 6b and 6c, the effect of the location of the crop edge with respect to the center of the scan on the output signal from field-effect transistor 107 can be appreciated. Specifically, the illustrations in each depict respectively a view of the crop material scanned, the scan signal, the reference signal, and the output signal from field-effect transistor 107 when the crop edge occurs at the center of the scan. In FIG. 6a, the various signals are depicted for the situation where the crop edge occurs at the center of the scan whereas in FIGS. 6b and 6c, the corresponding signal waveforms are depicted when the crop edge occurs to the left of the center of the scan and to the right of the center of the scan, respectively. Comparing the output signals from field-effect transistor 107 for each of the three situations depicted respectively in FIGS. 6a, 6b and 6c, it can be appreciated from the cross-hatched areas corresponding to the first scan in each figure, that the time-average signal is zero when the crop edge occurs at the center of the scan, positive when the crop edge occurs to the left of the center of the scan and negative when the crop edge occurs to the right of the center of the scan.

The output signal from field-effect transistor 107 is accordingly integrated by integrator circuit 76 preferably comprised of an operational amplifier 115 having a resistor 116 and capacitor 117 feedback network as shown in FIG. 7b. The integrator 76 integrates the output signal from field effect transistor 107 and producing an output signal equal to the time average thereof. Accordingly, it can be appreciated that the polarity of the output signal from integrator 76 will depend on the location of the crop edge with respect to the center of the scan equalling zero when the crop edge occurs at the center thereof.

The output from integrator 76 is coupled to a contact 121 and to a unity-gain inverter circuit 122 having an output connected to contact 123. Contacts 121, 123 and 124 comprise a switching circuit 125 which will couple either the output of integrator 76 or its inverse to the utilization means 126. The switching circuit 125 which may consist of the contacts of a relay as shown in FIG. 7b, is incorporated to provide an output signal $V_{ERR}$ having a polarity which is consistent with respect to the deviation of the crop edge from the center of the crop and insensitive to transistors in reflectivity. More particularly, the switching circuit 125 in cooperation with the inverting circuit 122 insure that the polarity of the error signal $V_{ERR}$ will remain consistent regardless of whether or not the scan consists of a high reflectivity to a low reflectivity transition or a low reflectivity to a high reflectivity transition.

In order to insure that the proper output is connected to utilization means 126, the output from the limiter stage 90 is coupled to a second electronic switching circuit 131, preferably an N-channel, field-effect transistor. The gate signal for transistor 131 is derived from the reference amplifier circuit 74. More particularly, the output from the reference amplifier 74 is coupled through capacitor 139 to the polarity sync circuit 133 comprising transistor 134, diode 135 and resistors 136, 137 and 138. Transistor circuit 133 is arranged so that the pulse is provided to the gate of transistor 131 at the beginning (or at the termination if desired) of each sampling or reference signal. As a result, at the beginning of each scan, the output signal from limiter stage 90 is coupled through transistor 131 to amplifier circuit 141. Amplifier circuit 141 is comprised of an operational amplifier 142 with a resistor 143 and capacitor 144 feedback served having an RC time constant sufficient to provide adequate filtering of the amplified signal between gating pulses from transistor circuit 133. The output from amplifier circuit 141 is coupled to a diode bridge circuit 145 comprised of diodes 146, 147, 148 and the base-emitter junction of transistor 151. In the configuration shown in FIG. 7b, transistor 151 is normally conducting thereby preventing transistor 152 from conducting and maintaining relay 153 in the de-energized mode. If the output from amplifier circuit 141 becomes positive with respect to ground, transistor 151 is unaffected. However, if the output from amplifier circuit 141 becomes sufficiently negative, bias current is removed from transistor 151 causing it to revert to the non-conducting state. In response thereto, transistor 152 will begin conducting thereby energizing relay 153 causing the inverted output from inverter circuit 122 to be coupled to the utilization circuit 126. It can thus be appreciated that a change in the reflectivity transition from high to low or low to high will be compensated for by the foregoing circuitry.

A sensitivity amplifier circuit 161 is incorporated to provide an indication to the operator when the ambient lighting conditions are such that the contrast between the reflected illumination from the cut versus the uncut crop is insufficient to be reliable. Obviously, there will occur times, such as for example at dawn, at dusk, etc., when the ambient lighting is insufficient to provide an adequate contrast ratio between the cut versus the uncut crop. Moreover, there may occur times when the crop in the field-of-view of the collimator has a crop edge which is not well enough defined to provide the minimum contrast ratio necessary to provide reliable operation. Accordingly, the sensitivity amplifier 161 is incorporated to provide an indication to the operator when the contrast ratio has dropped to a level considered unreliable for proper operation, such as, for example, 5%. For the purposes of this discussion, the contrast ratio CR is defined by the following equation:

$$, CR = (V_{UNCUT} - V_{CUT}/V_{UNCUT} + V_{CUT}) \qquad (1)$$

where $V_{CUT}$ and $V_{UNCUT}$ are the signals generated by the photodetector 65 in response to the reflected illumination from the cut and uncut crop, respectively.

The sensitivity amplifier 161 is comprised of an operational amplifier 162 having a variable resistor 163 and a pair of input terminals coupled to nodes 164 and 165 of diode bridge 145. The sensitivity amplifier 161, therefore, provides an output signal to a warning device 167 for as long as the contrast ratio (as represented by the transition from the low reflectivity side of the scan to the high reflectivity side of the scan or vice versa) is greater than a predetermined magnitude as determined by the variable resistor 163. Should the contrast ratio drop below this predetermined value, the signal to the warning device 167 will terminate thereby resulting in a warning to the operator or other appropriate action.

In order to provide proper operation, decoupling circuits 171, 172, 173 and 174 are connected to the motor 63, amplifier 81, amplifier 93 and limiter stage 88 respectively, to eliminate noise therefrom. Additionally, all of the electronics including the optical bandpass filter 64, photodetector 65, and the reference pickoff circuit 71, are enclosed in the collimator tube to provide light shielding therefor.

Provisions are also made for coupling the input from an external zero control circuit 176 to the input of integrator circuit 76. With the incorporation of such a circuit, a d.c. signal may be coupled to the input of the integrator to effectively shift the location from the scan at which a zero output voltage $V_{ERR}$ will occur. Accordingly, any predetermined point within the scan may be chosen as the reference point from which deviations therefrom will result in an appropriate compensation by the harvesting machine induced by the utilization means.

It can be appreciated, therefore, that the present invention comprises a balanced reflectivity optical crop edge sensor system which may be utilized to regulate the lateral movement of the harvesting machine with respect to the crop edge. By determining the point in the scan where a discontinuity exists due to the crop edge, a signal may be generated which is indicative of the location thereof and which may be utilized to compensate the machine accordingly. Furthermore, means are provided to compensate the output signal with respect to changes in the reflectivity transitions from high to low or low to high and for providing an indication when the contrast between the reflected illumination from the cut versus the uncut crop is insufficient to provide reliable operation.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. Guidance assist apparatus for directing the lateral movement of an agricultural machine relative to the edge of a severed crop comprising:
    optical sensing means for producing a signal in response to the intensity of the reflected illumination from the crop material in view thereof,
    scanning means disposed relative to said optical sensing means for providing thereto periodic scans of the crop material preceding the machine wherein said periodic scans include the severed crop edge and wherein the signal from said optical sensing means will change in response to the intensity of the reflected illumination from the crop and severed crop material as the severed crop edge is scanned thereby resulting in a discontinuity in the output signal therefrom,
    circuit means coupled to said optical sensing means for providing an error signal representative of the deviation of the discontinuity in the output signal of said optical sensing means from a predetermined point in the scan, and
    utilization means responsive to said error signal for directing the lateral movement of the machine so that said error signal reduces toward zero.

2. The apparatus as described in claim 1 wherein said optical sensing means includes:
    first photodetecting means for producing electrical signals in response to illuminations thereon and wherein the magnitude of the electrical signals produced thereby vary as a function of intensity of the illuminations,
    bandpass filter means, optically preceding said first photodetecting means, for providing illuminations to said photodetecting means having a wavelength in which the difference between the intensities of the reflected illuminations from the severed and unsevered crops is substantial, and
    first amplifier means for amplifying the output signal from said first photodetecting means.

3. The apparatus as described in claim 2 wherein the scanning means includes a disc having a plurality of uniformly spaced apertures and means for rotating said disc such that the apertures therein rotate by said optical sensing means.

4. The apparatus as described in claim 3 wherein said circuit means includes:
 low pass filter means coupled to said first amplifier means for filtering from the output therefrom periodic fluctuations therein due to the passage of the appertures by said optical sensing means,
 limiter amplifier means coupled to said low pass filter means for limiting the output of the signal therefrom to a square wave referenced at the midpoint of said discontinuity in the signal due to the severed crop edge,
 integrator means coupled to the output of said limiting amplifier means for integrating the output signal therefrom, and
 reference circuit means coupled between said limiting amplifier means and said integrator means for providing to said integrating means a symmetrical sampling of the output from said limiter amplifier means with respect to said predetermined point along the scan and including said discontinuity such that said integrator means produces the error signal having a magnitude of zero when the severed crop edge occurs at said predetermined point along the scan and having an appropriate magnitude and polarity in response to a deviation therefrom.

5. The apparatus as described in claim 4 wherein said circuit means further includes offset circuit means for coupling a signal to the input of said integrator means and effectively readjusting said predetermined point thereby.

6. The apparatus as described in claim 4 wherein said reference circuit means includes:
 an illumination source means proximately disposed with respect to the apertures of said disc means for providing a source of illumination,
 second photodetecting means disposed relative to said illumination source means and said disc, such that a synchronous illumination with respect to each scan of the crop viewed by said optical sensing means is provided thereto, for generating electrical signals in response to said synchronous illuminations, and,
 switching means coupled between said limiter amplifier means and said integrator means for coupling the output of said limiter amplifier means thereto in response to the electrical signals generated by said second photodetecting means.

7. The apparatus as described in claim 6 further including means for maintaining said error signal independent of whether the relatively more intense illumination is scanned prior to or subsequent to the severed crop edge comprising:
 polarity circuit means responsive to said second photodetecting means for detecting the polarity of the output from said limiter amplifier means at either extremity of said symmetrical sampler thereof and providing an invert signal in response to a change in the polarity thereof, and
 inverter circuit means coupled to the output of said integrator means for inverting the signal therefrom in response to said invert signal.

8. The apparatus as described in claim 7 further including means coupled to said polarity circuit means for determining if the contrast between the illumination reflected from the crop on either side of the severed crop edge is sufficient for operation of the system and for providing a warning signal when said contrast is insufficient.

9. The apparatus as described in claim 3 wherein said circuit means includes:
 first, second and third reference detector circuits cooperating with said scanning means to provide first, second and third uniform sampling signals corresponding to the initial, middle and latter portions respectively of each scan of the crop viewed by said optical sensing means,
 first, second and third switching means each having an input coupled to the output of said first amplifier means and responsive to the first, second and third sampling signals respectively,
 first summing means coupled to the outputs of said first and third switching means for summing the outputs therefrom,
 second amplifier means having a gain of $-2$ and coupled to the output of said second switching means for amplifying the output therefrom accordingly,
 second summing means having an input coupled to the output of said first summing means and an input coupled to the output of said second amplifier means for generating an error signal equal to the summation thereof, and
 low pass filter means coupled to the output of said second summing means for filtering therefrom the frequency component in said output signal due to the rotation of said apertures by said optical sensing means and wherein the output therefrom is a d.c. signal having zero magnitude when the severed crop edge occurs in the middle portion of the scan and having an appropriate magnitude and polarity in response to deviations of the crop edge therefrom.

10. The apparatus as described in claim 2 wherein the central wavelength of the optical bandpass filter is 6500 Angstroms.

11. The apparatus as described in claim 2 wherein the first photodetecting means is comprised of a photo diode.

* * * * *